United States Patent Office 3,155,726
Patented Nov. 3, 1964

3,155,726
OXY-PHENYL-2-(1-METHYL-2-PHENOXY-
ETHYLAMINO)-ALKANOLS
William A. Gould and John A. La Budde, Evansville,
Ind., assignors to Mead Johnson & Company, Evansville, Ind., a corporation of Indiana
No Drawing. Filed Jan. 29, 1962, Ser. No. 169,619
4 Claims. (Cl. 260—570.6)

This invention relates to new compositions of matter and more particularly to compositions of the structure

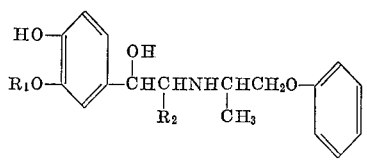

Compound I wherein $R_1$ is lower alkyl, and $R_2$ is selected from the group consisting of hydrogen and methyl, and to methods for their production. The lower alkyl groups defined by $R_1$ preferably contain up to about 5 carbon atoms and is exemplified by groups such as methyl, ethyl, propyl, butyl, amyl, isoamyl and the like. The nontoxic, pharmaceutically acceptable acid addition salts of these compounds are also contemplated as a part of the invention.

The compounds of the present invention are smooth muscle depressants and have utility as uterine muscle relaxants, anti-hypertensive agents, and vasodilators. These compounds are distinguished by their selective action on smooth muscle and on blood vessels of the peripheral beds with minimal effect on heart action. The daily dosage for mammals is from about 0.2 to 5 milligrams per kilogram of body weight administered singly or in divided doses. These compounds may be administered parenterally as solutions or suspensions, or orally in the form of elixirs, solutions, suspensions, tablets, capsules, or the like.

The compositions of the present invention are prepared by processes which involve as one step the condensation of a substance of the structure of Compound II with a substance of the structure of Compound III wherein $R_3$ represents a hydrogen atom or a group replaceable thereby such as a benzyl group, tertiary butyl group, or an acyl group such as acetyl; Z represents $>C=O$ or $>CHOH$, and $R_1$ and $R_2$ have the same meaning as in Compound I. $Y_1$ and $Y_2$ are functional groups which undergo condensation under reaction conditions to form an NH group to which the carbon structures of Compounds II and III are attached as in Compound IV.

EQUATION A

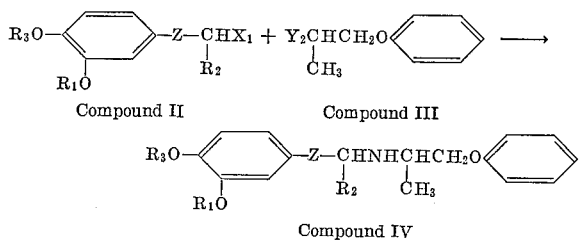

One manner of applying the process of Equation A involves the condensation of Compound II in which $R_3$ is a benzyl group, Z is CO, and $Y_1$ is a halogen atom such as chlorine or bromine with 1-phenoxy-2-propylamine, Compound II in which $Y_2$ is $NH_2$. This is illustrated by Equation B in which X represents chlorine or bromine.

EQUATION B

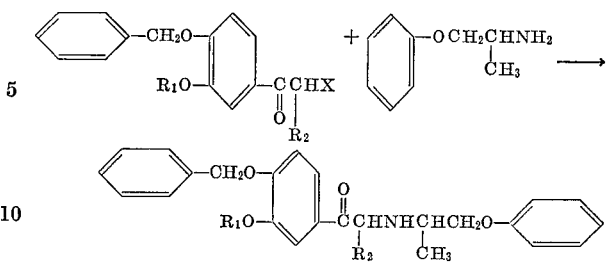

The resulting intermediate, Compound IV, in which $R_3$ is benzyl and Z is $>C=O$, is catalytically hydrogenated to produce the compound of the invention I in accordance with Equation C:

EQUATION C

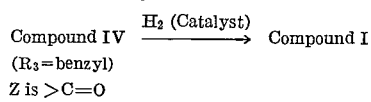

($R_3$=benzyl)
Z is $>C=O$

The condensation reaction of Equation B may be carried out in a solvent medium at tmperatures of from about 25 to 150° C. Reaction at elevated temperatures (80°–100° C.) is preferred. Solvents which may be utilized are alcohols, such as methanol, ethanol, and propanol, hydrocarbons, such as hexane, xylene, and the like, or other inert solvent materials. The condensation reaction is preferably carried out in the presence of an alkaline acid scavenger, such as sodium hydroxide, sodium carbonate, or the like.

Catalytic hydrogenation of Compound IV to Compound I is preferably carried out in a solvent medium, such as for example ethanol or an inert hydrocarbon solvent in the presence of a hydrogenation catalyst including noble metal catalysts, such as palladium-on-carbon, platinum oxide, and the like. The pressures which may be utilized in the hydrogenation step are variable, but generally pressures from about 15 to 60 pounds per square inch gauge are satisfactory.

The starting materials used for preparing Compound II in which $Y_1$ is chlorine or bromine are derived from orthoalkoxyphenols, such as ortho-methoxyphenol (guaiacol) which is reacted with an organic acid selected from the group consisting of acetic and propionic acids, the halides, and the anhydrides thereof, or by Fries rearrangement of acetic or propionic acid esters of ortho-alkoxyphenols, to produce a 4-hydroxy-3-alkoxy aceto- or propiophenone which is subsequently treated with an aralkyl halide, such as benzyl chloride, to prepare the corresponding ether derivative, and then halogenated to produce Compound II in which Z is $>C=O$, $R_3$ is benzyl, $Y_1$ is chlorine or bromine, and $R_1$ and $R_2$ have the same meaning as before.

An alternative manner in which the process of Equation A can be applied to the synthesis of the present substances is by reductive alkylation of phenoxyacetone, Compound III in which $Y_2$ is a carbonyl oxygen atom (the carbon atom to which $Y_2$ is attached in this case bears no hydrogen), with Compound II in which $Y_1$ is the amino group, $NH_2$. This is illustrated by Equation D.

EQUATION D

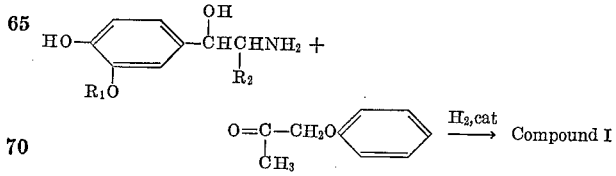

According to this method the carbonyl component,

Compound III, and the amine component, Compound II, are dissolved in a hydrogenation stable solvent such as acetic acid or ethanol and the mixture is hydrogenated over a platinum or a nickel catalyst until the stoichiometric quantity of hydrogen has been absorbed. Pressures of from 1 to 100 atmospheres are employed, the higher pressures being necessary for use with the nickel catalyst. In conducting this process with reactants having the formula of Compound II in which $Y_1$ is $NH_2$, $R_3$ is the benzyl group, Z is $>C=O$, and $R_1$ and $R_2$ are the same as above, the benzyl and $>C=O$ groups are subject to hydrogenation under the conditions of the reaction and are reduced to hydroxyl groups to produce Compound I.

This application is a continuation-in-part of our copending application Serial Number 92,466, filed March 1, 1961, and now abandoned.

The following examples will illustrate the preparation of the compositions of the present invention:

*Examples*

(a) 4-hydroxy-3-methoxypropiophenone: The procedure of Fodor, Kiss and Szekerke, J. Org. Chem. 15, 227 (1950) is used. A solution of 24.8 g. (0.02 mole) of guaiacol and 29.6 g. (0.4 mole) of propionic acid is saturated with 30.0 g. (0.45 mole) of boron trifluoride while cooling with ice. The thick red mixture is heated at 70° C. for 90 minutes in a water bath and then poured into a solution of 44.0 g. of anhydrous sodium acetate in 180 ml. of water. The aqueous mixture is extracted with ether. The ethereal extract is dried over anhydrous magnesium sulfate, filtered, and the ether is removed by distillation. The residue is distilled under reduced pressure to give 18.1 g. (50% yield) of 4-hydroxy-3-methoxypropiophenone, B.P. 110–125° C. (0.15 mm.).

(b) 4-benzyloxy-3-methoxypropiophenone: An adaptation of the procedure of Suter et al., J. Am. Chem. Soc., 66, 747 (1944) is used. A mixture of 18.1 g. (0.1 mole) of 4-hydroxy-3-methoxypropiophenone, 14.0 g. (0.11 mole) of benzyl chloride, 17.2 g. (0.125 mole) of anhydrous potassium carbonate and 1.5 g. (0.01 mole) of sodium iodide in 50 ml. of ethanol containing 0.8 ml. of water is stirred and refluxed for 5 hours. The cooled mixture is diluted with 500 ml. of water and filtered. The solid is washed with water and allowed to air-dry; yield 25.1 g. (92%), M.P. 91–98° C. After one recrystallization from isopropyl ether, the material melts at 98–101° C.

(c) α-bromo-4-benzyloxy-3-methoxypropiophenone: Bromine, 29.5 g. (0.85 mole) is added in dropwise fashion with stirring to a suspension of 50.0 g. (0.185 mole) of 4-benzyloxy-3-methoxypropiophenone in 500 ml. of anhydrous ether containing 0.5 g. of dibenzoyl peroxide. The pale yellow-color solution is stirred for two hours at room temperature, diluted with an additional 500 ml. of ether, and the ethereal solution washed successively with water, 15% sodium carbonate solution, and finally with water. The ethereal solution is dried over anhydrous magnesium sulfate, filtered, and the solvent removed by distillation, yielding the desired product weighing 62 g. (98%), M.P. 76–84° C. This material is twice recrystallized from isopropyl ether yielding the pure crystalline product which exhibits M.P. 87–90° C.

*Analysis.*—Calcd. for $C_{17}H_{17}BrO_3$: C, 58.46; H, 4.91; Br, 22.88. Found: C, 58.65; H, 4.11; Br, 22.47.

(d) Phenoxyacetone: This material is prepared according to Hurd and Perletz, J. Am. Chem. Soc. 68, 38 (1946). In a 2 l. flask are placed 100 g. (1.06 mole) of phenol, 34 g. of potassium carbonate and 140 ml. of dry acetone. In a 500 ml. separatory funnel are placed 138 g. (1.5 mole) of chloroacetone, 5 g. of potassium iodide and 130 ml. of dry acetone. These two mixtures are allowed to stand 20 hours. The mixture in the flask is stirred and refluxed for 15 minutes, then the chloroacetone mixture is slowly added dropwise. After one-quarter of the mixture has been added, 34 g. of potassium carbonate is added. This procedure is repeated twice until 138 g. of potassium carbonate has been added. Dry acetone (100 ml.) is added in order to thin the mixture. The mixture is stirred for 15 hours, filtered, and the filter cake washed thoroughly with acetone. The acetone is removed by distillation and the residue is distilled at reduced pressure; B.P. 140–145° C. (42 mm.); yield, 145.0 g. (91%).

(e) 1-phenoxy-2-propylamine hydrochloride: Phenoxyacetone is reductively aminated according to the procedure of Moed and Van Dijk, Rec. trav. chim. 75, 1215 (1956). A mixture of 145 g. (0.97 mole) of phenoxyacetone, 500 ml. of ethanol, 155 ml. of 25% ammonia and 60 g. of freshly prepared Raney nickel is hydrogenated at room temperature and atmospheric pressure. The reaction mixture is filtered, concentrated to 300 ml. and neutralized with 15% hydrochloric acid. The solvent is removed by distillation at reduced pressure. The residue is treated with acetone and filtered; 76.0 g. (42%), M.P. 144–146° C.

(f) 4-benzyloxy-3-methoxy-α-(1-methyl - 2 - phenoxyethylamino)propiophenone hydrochloride: An aqueous solution of 47.0 g. (0.25 mole) of 1-phenoxy-2-propylamine hydrochloride is made alkaline with 10 N sodium hydroxide solution. The alkaline mixture is extracted with ether and the ethereal solution is dried over anhydrous magnesium sulfate and filtered. The ether is removed by distillation and the residue (37.9 g.) is dissolved in 50 ml. of ethanol. The ethanolic solution is mixed with a solution of 34.8 g. (0.10 mole) of α-bromo-4-benzyloxy - 3 - methoxypropiophenone in 150 ml. of ethanol and refluxed for 5 hours. The ethanol is removed by distillation at reduced pressure and 500 ml. of isopropyl ether is added to the residue. The precipitate (1-phenoxy-2-propylamine hydrobromide) is collected on a filter and the filtrate is neutralized with ethanolic hydrogen chloride. The supernatant liquid is decanted from the precipitated oil and the oil is crystallized by treatment with a butanone-isopropyl ether mixture. The precipitate (1-phenoxy - 2 - propylamine hydrochloride, M.P. 147–149° C.; 16.6 g.) is collected on a filter and the filtrate is evaporated to yield the desired product. It is dissolved in hot 95% ethanol and the solution chilled to provide 16.5 g. of the crystalline product, M.P. 134–185° C. (dec.). After two recrystallizations from 95% ethanol the purified product melts at 208–210° C. (dec.).

*Analysis.*—Calcd. for $C_{26}H_{29}NO_4 \cdot HCl$: C, 68.48; H, 6.63; N, 3.07; Cl, 7.78. Found: C, 68.48; H, 6.68; N, 2.92; Cl, 7.81.

4-benzyloxy-3-methoxy-α-(1-methyl - 2 - phenoxyethylamino)-propiophenone hydrochloride exhibits the following ultra violet absorption spectrum:

$\lambda_{max.}^{ethanol}$ 232 mμ (ε 15,400); 277 mμ (ε 13,150), 311 mμ (ε 10,450)

and the following infrared absorption spectrum:

$\lambda_{max.}^{KBr}$ 2.90, 3.40, 4.1, 5.97, 6.27, 6.6, 6.8, 7.0, 7.2, 7.4, 7.85, 8.1, 8.3, 8.5, 8.65, 9.15, 9.9, 13.3, 14.4μ

(g) 1 - (4 - hydroxy-3-methoxyphenyl)-2-(1-methyl-2-phenoxyethylamino)-propanol·HCl·¼H₂O: A mixture of 1.0 g. (0.0022 mole) of 4-benzyloxy-3-methoxy-α-(1-methyl-2-phenoxyethylamino)-propiophenone hydrochloride (Example f), 0.3 g. of 10% palladium-on-carbon and 100 ml. of 80% aqueous ethanol is hydrogenated at an initial pressure of 60 pounds of hydrogen until the calculated amount of hydrogen has been absorbed. The mixture is filtered and the filtrate is evaporated at reduced pressure. The residue (0.8 g.) is recrystallized from an ethanol-benzene mixture; M.P. 150–152° C.

*Analysis.*—Calcd. for $C_{19}H_{25}NO_4 \cdot HCl \cdot \frac{1}{4}H_2O$: C, 61.32; H, 7.17; N, 3.76. Found: C, 61.32; H, 7.25; N, 3.76. This substance exhibits the following ultraviolet absorption spectrum:

$\lambda_{max.}^{ethanol}$ 277 mμ (ε 3,600)

and the following infrared absorption spectrum:

$\lambda_{max.}^{KBr}$ 2.95, 3.38, 4.15, 6.27, 6.60, 6.70, 6.80, 7.00, 7.20, 7.90, 8.05, 8.25, 8.55, 8.90, 9.27, 9.60, 9.95, 12.20, 13.20, 14.50μ

The identity of this product as a 1-(4-hydroxy-3-methoxyphenyl)propanol compound is confirmed by oxidative degradation thereof to vanillin. When a small sample thereof, 5 mg., is oxidized by treatment with 5 ml. of 0.1 N $Na_2CO_3$ and 2 ml. of an aqueous solution containing 20 mg. of periodic acid for 15 minutes at room temperature, the solution acidified to pH 2 with hydrochloric acid, and extracted with ether, vanillin is identified as the degradation product contained in the ether extract by comparison of the ultraviolet absorption spectrum thereof to that of authentic specimen of vanillin. Conversion of it to the 2,4-dinitrophenylhydrazone derivative, found to exhibit M.P. 272–274° C., serves as further confirmation since the derivative obtained is identical with that of vanillin.

The product may be further characterized by paper chromatography. Data for papergrams prepared in several solvent systems are arranged in the following table. The location of 1-(4-hydroxy-3-methoxyphenyl)-2-(1-methyl-2-phenoxyethylamino)propanol on the papergram is facilitated by the fact that it gives a purple color with diazotized p-nitroaniline and an orange color with diazotized sulfanilic acid (preparation of the test solutions is described in "A Manual of Paper Chromatography and Paper Electrophoresis" by R. J. Block, and G. Ziveig, Academic Press, Inc., 1958, p. 305).

| Type of Paper | Solvent System | $R_f$ |
| --- | --- | --- |
| Whatman No. 1 | Ethylene dichloride, 80; heptane, 15; isoamyl alcohol, 5; acetic acid, 70; water, 30. | 0.75 |
| Whatman CM50[1] | 0.02 M phosphate buffer pH 5.5 | 0.17 |
| Whatman DE20[2] | do | 0.51 |
| Whatman AE30[3] | do | 0.68 |
| Whatman P20[4] | n-propanol, 2; ethanol, 1; 0.08 M phosphate buffer pH 5.5, 1. | 0.90 |

[1] Carboxymethyl cellulose ion exchange paper.
[2] Diethylaminoethyl cellulose ion exchange paper.
[3] Aminoethyl cellulose ion exchange paper.
[4] Cellulose phospahte ion exchange paper.
[1,2,3,4] H. Reeve Angel & Co., Inc. 9 Birdewell Place, Clifton, N.J.

From the foregoing it is apparent that other compounds may readily be prepared in accordance with the foregoing examples by appropriate selection of the desired starting materials.

Thus for example in the preparation of 1-(4-hydroxy-3 - ethoxyphenyl-2-(1-methyl-2-phenoxyethylamino)-ethanol, the starting procedure involves reaction of 2-ethoxyphenol with acetic acid in the presence of a boron trifluoride catalyst by the procedure of Example a to produce 4-hydroxy-3-ethoxy acetophenone. This product is utilized in the synthesis of the desired above mentioned composition following the steps and procedure of Examples b through g. This and the homologous ortho-alkoxyphenols needed as starting materials are obtained by the method described by E. Klarmann, et al., Jour. Amer. Chem. Soc. 54, 1204 (1932).

For the preparation of 1-(4-hydroxy-3-methoxyphenyl)-2-(1-methyl-2-phenoxyethylamino)ethanol a similar sequence is employed. Intermediates h, i and j, corresponding to the intermediates prepared in Example a, b, and c above, are obtained according to published procedures as follows:

(h) 4-hydroxy-3-methoxyacetophenone: T. Reichstein, Helv. Chim, Acta, 10, 392 (1927).

(i) 4-benzyloxy-3-methoxyacetophenone: B. Leopold, Acta Chem. Scand., 4, 1423 (1950).

(j) α-bromo-4-benzyloxy-3-methoxyacetophenone: B. Leopold, Acta Chem. Scand., 4, 1523 (1950).

Intermediate j is then condensed with 1-phenoxy-2-propylamine (Example e) according to the method of Example f, and the resulting substance is converted to 1 - (4-hydroxy-3-methoxyphenyl)-2-(1-methyl-2-phenoxyethylamino)ethanol by hydrogenolysis as described in Example g.

From the foregoing it will be understood that since the compounds of the invention contain either two (when $R_2$ is H) or three (when $R_2$ is $CH_3$) asymmetric carbon atoms, or centers of asymmetry, a number of stereoisomeric modifications of the compounds are possible. Such stereoisomers are intended to be comprehended as a part of this invention. Two of the possible racemic mixtures of the substances of Example f and g may be prepared in pure crystalline form according to Examples k, l, m, n, o, and p which follow.

(k) 4 - benzyloxy-3-methoxy-α-(1-methyl-2-phenoxyethylamino)propiophenone hydrochloride: Example f is repeated employing 34.0 g. (0.18 mole) of 1-phenoxy-2-propylamine hydrochloride and 31.4 g. (0.09 mole) of α - bromo - 4-benzyloxy-3-methoxypropiophenone. After removing the ethanol solvent by distillation on completion of the 5 hr. reflux period, the residue is dissolved in diethyl ether. The ether solution is washed with water and then dried over anhydrous magnesium sulfate. The drying agent is removed by filtration and the ethereal filtrate concentrated to dryness. The residue weighs 38.3 g. It is dissolved in 700 ml. of acetone and neutralized with ethanolic hydrogen chloride. 4-benzyloxy-3-methoxy-α-(1 - methyl-2-phenoxyethylamino)propiophenone hydrochloride precipitates as a white crystalline solid, yield 26.0 g. (64%), M.P. 173–196° C.

Analysis.—Calcd. for $C_{26}H_{29}NO_4 \cdot HCl$, C, 68.48; H, 6.63; N, 3.07; Cl, 7.78; $CH_3O$, 6.81. Found: C, 68.64; H, 6.33; N, 3.12; Cl, 7.80; $CH_3O$, 6.92.

(l) 4 - benzyloxy - 3-methoxy-α-(1-methyl-2-phenoxyethylamino)propiophenone hydrochloride, α-racemate: A portion of the product of Example k, 19.8 g., is stirred with 300 ml. of boiling isopropyl alcohol. The insoluble material is collected on a filter, weight 9.2 g., M.P. 188–194° C. This material is twice recrystallized from isopropyl alcohol yielding the purified α-racemate of 4-benzyloxy - 3 - methoxy - α - (1-methyl-2-phenoxyethylamino) propiophenone hydrochloride, M.P. 194–198° C.

$\lambda_{max.}^{C_2H_5OH}$ 312 mμ (ε=10,950), 278 mμ (ε=13,280), 233 mμ (ε=15,820).

The results of microanalysis for carbon, hydrogen, nitrogen, chlorine, and methoxyl are in agreement with the analytical results obtained and composition calculated in Example k.

(m) 4-Benzyloxy - 3-methoxy-α-(1-methyl-2-phenoxyethylamino)-propiophenone hydrochloride, β-racemate: The hot isopropyl alcohol filtrate from Example l is allowed to cool, resulting in crystallization of the β-racemate of 4-benzyloxy-3-methoxy-α(1-methyl-2-phenoxyethylamino)propiophenone hydrochloride. This material is collected, washed on the filter, and dried, weight 9.0 g., M.P. 178–180° C. After recrystallization from isopropyl alcohol, the purified product is obtained, M.P. 175–180° C.

$\lambda_{max.}^{C_2H_5OH}$ 312 mμ (ε=10,110), 278 mμ (ε=12,810), 232 mμ (ε=16,050).

The results of microanalysis for carbon, hydrogen, nitrogen, chlorine, and methoxyl are in agreement with the analytical results obtained and compositions calculated in Example k.

(n) Erythro 1-(4-hydroxy-3 - methoxyphenyl) - 2 - (1-methyl-2-phenoxyethylamino)propanol hydrochloride: A 10 g. portion (0.022 mole) of the product of Example m is dissolved in 150 ml. of 70% aqueous ethanol and hydrogenated at 60 p.s.i.g. over 2.5 g. of 10% palladium-on-carbon catalyst. Hydrogenation is continued at room temperature until the stoichiometric quantity of hydrogen has been absorbed. The catalyst is removed by filtration and the solvent distilled from the filtrate at reduced pressure. The residue is dried by adding 100 ml. of benzene thereto, and distilling at reduced pressure. The residue is then triturated with acetonitrile and the product collected on a filter, weight, 5.3 g., M.P. 181–185° C. After recrystallization from acetonitrile, the purified product exhibits M.P. 186–188° C.

$\lambda_{max.}^{0.1\,NHCl}$ 275 m$\mu$ ($\epsilon = 3,350$)

Infrared absorption maxima are exhibited at the following wave lengths:

$\lambda_{max.}^{KBr}$ pellet: 3.02, 3.42, 3.60, 4.10, 6.29, 6.60, 6.72, 6.86, 7.02, 7.20, 7.90, 8.10, 8.30, 8.58, 8.66, 9.02, 9.13, 9.30, 9.60, 9.70, 9.95, 11.72, 12.02, 12.42, 12.75, 13.30, 14.50$\mu$.

*Analysis.*—Calcd. for $C_{19}H_{25}NO_4 \cdot HCl$: C, 62.08; H, 7.12; N, 3.81; Cl, 9.64. Found: C, 61.79; H, 7.24; N, 3.83; Cl, 9.38.

(*o*) Alloerythro 1-(4-hydroxy-3-methoxyphenyl)-2-(1-methyl - 2 - phenoxyethylamino)propanol hydrochloride: Example *n* is repeated substituting 14.7 g. (0.032 mole) of the product of Example *l* as the starting material. After completion of the hydrogenation, separation of the catalyst, evaporation of the solvent, and drying of the residue by distillation of benzene therefrom, the residue is recrystallized from acetonitrile, yield, 5.2 g., M.P. 124–130° C. This material is recrystallized once from a mixture of benzene and ethanol and again from acetonitrile to yield 3.8 g. of the purified product, M.P. 135–138° C.

$\lambda_{max.}^{0.1\,NHCl}$ 275 m$\mu$ ($\epsilon = 3680$). Infrared absorption spectrum, $\lambda_{max.}^{KBr}$ pellet: 3.04, 3.39, 3.57, 4.18, 6.27, 6.60, 6.68, 6.82, 6.99, 7.20, 7.90, 8.05, 8.25, 8.58, 8.74, 8.90, 9.30, 9.60, 9.68, 10.02, 11.30, 11.50, 12.02, 12.35, 12.50, 13.25, 14.50$\mu$.

*Analysis.*—Calcd. for $C_{19}H_{25}NO_4 \cdot HCl$: C, 62.03; H, 7.12; N, 3.81; Cl, 9.64. Found: C, 62.18; H, 7.36; N, 3.94; Cl, 9.35.

(*p*) Erythro 1-(4-hydroxy-3 - methoxyphenyl) - 2 - (1-methyl - 2 - phenoxyethylamino)propanol hydrochloride: The mixture of $\alpha$- and $\beta$-racemates of 4-benzyloxy-3-methoxy-$\alpha$-(1-methyl - 2 - phenoxyethylamino)propiophenone hydrochloride produced in Example *k* is hydrogenated substantially as described in Example *n* and the residue obtained after filtration of the catalyst and distillation of the ethanolic solvent from the filtrate is dissolved in acetonitrile. A precipitate forms on standing which is collected on a filter, yield, 4.4 g., M.P. 179–193° C. This material is twice recrystallized from acetonitrile to yield the pure erythro isomer identical in infrared and ultra violet absorption spectrum with that of Example *n*, 2.3 g., M.P. 189–192° C. The melting point of a mixture of this material with the product of Example *n* is 189–192° C. This compound is a white crystalline solid, moderately soluble in water (3.3%), slightly soluble in alcohol and insoluble in ether. The pH of a 1% aqueous solution of it is 5.0–5.5.

1-(4-hydroxy-3-methoxyphenyl)-2-(1 - methyl-2-phenoxyethylamino)propanol described in Examples *n* and *p* is the preferred compound of this invention for uterine relaxant, vaso-dilator, and anti-hypertensive uses. It is substantially devoid of adrenergic $\beta$-receptor stimulating activity, but possesses marked adrenergic blocking and papaverine-like smooth muscle depressant action.

The latter properties are particularly evident when measured in vitro on the spontaneously contracting rat uterus in diesterus; on the quiescent astrogen dominated rat uterus induced to spasm by oxytocin or bradykinin; and on the isolated rat seminal vesticle induced to spasm by barium chloride or 1-norepinephrine. The uterine relaxant effect may also be demonstrated on the rat or rabbit uterus in situ with a living animal.

The drug is essentially free of cardiac stimulating action as observed on the isolated cat heart, the isolated rabbit heart, and in the anesthetized dog heart. In the latter, its hypotensive activity is evident as is its vasodilating activity as reflected by decreased peripheral resistance. It is a relatively non-toxic substance exhibiting an oral $LD_{50}$ value in the mouse of 236 mg./kg. and intravenously of 34.2 mg./kg. At doses in excess of those required to provide uterine relaxant, vasodilating or anti-hypertensive effects, it produces central nervous system depression.

(*q*) Alloerythro 1-(4-hydroxy-3-methoxyphenyl)-2-(1-methyl - 2 - phenoxyethylamino)propanol hydrochloride: The filtrate from Example *p* is concentrated to yield a substantially dry residue weighing 5.3 g. This material is recrystallized from an acetonitrile-benzene mixture to yield 2.5 g. of product, M.P. 124–130° C. This material is recrystallized from acetonitrile yielding 1.7 g. of the pure alloerythro racemate identical in infrared and ultra violet absorption spectrum with that of Example *o*, M.P. 136° C. The melting point of a mixture of this substance with that of Example *o* is 131–136° C.

(*r*) 1-(hydroxy-3-methoxyphenyl)-2-(1-methyl-2-phenoxyethylamino)propanol hydrochloride by reductive alkylation: 3-methoxy-4-hydroxy-d1-norephedrine, 9.86 g. (0.05 mole, Fodor et al., J. Org. Chem. 15, 230 (1950)), and 15.0 g. (0.10 mole) of phenoxyacetone are dissolved in 75 ml. of ethanol containing 2.8 ml. of glacial acetic acid and 1.0 g. of 5% platinum-on-carbon hydrogenation catalyst is added to the solution. The mixture is then hydrogenated with agitation at 20 p.s.i.g. until the stoichiometric quantity of hydrogen has been absorbed. Some material crystallizes from the solution during this process. The mixture is warmed to dissolve the crystallized material, and the catalyst is removed by filtration. The filtrate is concentrated to dryness and the residue mixed with 100 ml. of water containing 5 ml. of concentrated hydrochloric acid. The aqueous solution is washed well with ether and the aqueous layer is separated and concentrated to dryness. The oily residue is dried by mixing benzene therewith and distilling. The dried residue is then treated with insufficient acetonitrile to dissolve it and chilled overnight, resulting in formation of the crystalline erythro racemate of 1-(4-hydroxy-3-methoxyphenyl)-2-(1 - methyl-2-phenoxyethylamino)propanol hydrochloride. The crystalline material is collected, washed on the filter with cold acetonitrile, and dried, yielding 7.2 g. (39.2%) of the purified product, M.P. 183–186° C. The filtrate is concentrated to dryness and the residue purified as described in Example *q* to yield the corresponding alloerythro racemate.

The compositions of the present invention may be utilized as the free base or in the form of acid addition salts, such as the hydrochlorides, hydrobromides, sulfates, tartrates, mucates, citrates and the like, as are well known in the art.

The compositions may be prepared in the form of a pharmaceutical composition, containing the compositions heretofore described in conjunction with an inert, non-toxic pharmaceutically acceptable carrier material; for example, for oral administration in the form of tablets, carriers, such as maltose or starch, or admixtures thereof, in conjunction with conventional lubricants, additives or tableting aids, may be utilized. Tablets containing from 10 mg. to 40 mg. of active ingredient are a convenient size for oral use.

For parenteral use, aqueous solutions or solutions in isotonic sodium chloride containing suitable preservatives, buffers, etc., may be employed. A convenient concentration is 4 mg. per ml. Such a solution may be employed directly for intramuscular use or it may be diluted extemporaneously for intravenous use. Non-aqueous vehicles such as propylene glycol, peanut oil, sesame oil, etc. are also satisfactory for intra-muscular use. The following examples illustrate preparation of two representative pharmaceutical compositions.

(*s*) Solution for Injection: An intravenous solution containing the following materials in sufficient water for injection, USP, to provide 1000 ml. of solution is prepared:

| | Grams |
|---|---|
| Erythro 1-(4-hydroxy - 3 - methoxyphenyl) - 2 - (1-methyl - 2 - phenoxyethylamino) - propanol hydrochloride | 4.00 |
| Citric acid, anhydrous, USP | 4.20 |
| Sodium bisulfite | 0.50 |
| Sodium chloride | 7.50 |
| Sodium hydroxide, q.s. pH 40 | 4.00 |

This material is then subdivided and packaged in sealed ampoules, each containing 5 ml. of solution (20 mg. of active ingredient).

(t) Tablets: The following materials are dry blended in a suitable apparatus such as a twin-shell blender and a wet granulation is then prepared from the blend.

| | Kg. |
|---|---|
| Erythro 1-(4-hydroxy - 3 - methoxyphenyl) - 2 - (1-methyl - 2 - phenoxyethylamino) - propanol hydrochloride | 1.0 |
| Calcium phosphate, dibasic | 8.1 |
| Lactose | 10.1 |
| Corn starch | 2.0 |
| Dextrinized starch | 0.6 |

The resulting granulation is screened, dried, and re-screened. The granules are then coated with 0.2 kg. of magnesium stearate which serves as a tableting lubricant. The finished granules are compressed into tablets each weighing 220 mg. and containing 10 mg. of active ingredient.

All temperatures herein are expressed in degrees centigrade.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A composition selected from the group consisting of a compound of the formula

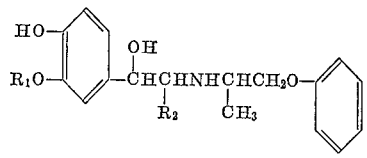

wherein $R_1$ is lower alkyl containing up to 5 carbon atoms and $R_2$ is selected from the group consisting of hydrogen and methyl; and the nontoxic, pharmaceutically acceptable acid addition salts thereof.

2. 1 - (4-hydroxy - 3 - methoxyphenyl) - 2 - (1-methyl-phenoxyethylamino)propanol.

3. 1 - (4-hydroxy - 3 - methoxyphenyl) - 2 - (1-methyl-2-phenoxyethylamino)ethanol.

4. 1 - (4-hydroxy - 3 - methoxyphenyl) - 2 - (1-methyl-2-phenoxyethylamino)propanol hydrochloride.

References Cited in the file of this patent

UNITED STATES PATENTS 3,056,836    Moed    Oct. 2, 1962

FOREIGN PATENTS 800,718    Great Britain    Sept. 3, 1958

UNITED STATES PATENT OFFICE
CERTIFICATE OF CORRECTION

Patent No. 3,155,726                            November 3, 1964

William A. Gould et al.

It is hereby certified that error appears in the above numbered patent requiring correction and that the said Letters Patent should read as corrected below.

Column 1, lines 55 to 58, for that portion of EQUATION A reading

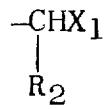            read            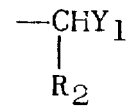

column 5, in footnote 4 of the table, for "phospahte" read -- phosphate --; column 7, line 33, for "10,02" read -- 10.02 --; line 53, for "This" read -- The --; line 66, for "astrogen" read -- estrogen --; same column 7, line 74, strike out "heart", second occurrence; column 8, line 19, for "hydroxy-" read -- 4-hydroxy- --; column 9, line 10, for "pH 40" read -- pH 4.0 --; column 10, line 22, for "phenoxyethylamino)propanol" read -- 2-phenoxyethylamino)propanol --.

Signed and sealed this 13th day of April 1965.

(SEAL)
Attest:

ERNEST W. SWIDER                          EDWARD J. BRENNER
Attesting Officer                     Commissioner of Patents